(12) United States Patent
Lee et al.

(10) Patent No.: US 8,212,794 B2
(45) Date of Patent: Jul. 3, 2012

(54) OPTICAL FINGER NAVIGATION UTILIZING QUANTIZED MOVEMENT INFORMATION

(75) Inventors: Wui-Pin Lee, Penang (MY); Willie Song, Penang (MY); Bee Hui Ch'ng, Kedah (MY)

(73) Assignee: Avago Technologies ECBU IP (Singapore) Pte. Ltd.

( * ) Notice: Subject to any disclaimer, the term of this patent is extended or adjusted under 35 U.S.C. 154(b) by 868 days.

(21) Appl. No.: 12/241,773

(22) Filed: Sep. 30, 2008

(65) Prior Publication Data

US 2010/0079411 A1   Apr. 1, 2010

(51) Int. Cl.
*G06F 3/042* (2006.01)
*G06F 3/033* (2006.01)

(52) U.S. Cl. ........ 345/175; 345/156; 345/157; 345/166; 250/221; 178/18.09

(58) Field of Classification Search .......... 345/173–176, 345/156–159; 250/221; 178/18.01–18.06, 178/18.09
See application file for complete search history.

(56) References Cited

U.S. PATENT DOCUMENTS

| | | | | |
|---|---|---|---|---|
| 4,734,685 A | * | 3/1988 | Watanabe | 345/157 |
| 5,424,756 A | * | 6/1995 | Ho et al. | 345/158 |
| 7,168,047 B1 | * | 1/2007 | Huppi | 715/784 |
| 7,313,255 B2 | * | 12/2007 | Machida et al. | 382/107 |
| 2004/0234107 A1 | | 11/2004 | Machida et al. | |
| 2005/0012714 A1 | * | 1/2005 | Russo et al. | 345/157 |
| 2005/0143870 A1 | * | 6/2005 | Yoshio et al. | 701/2 |
| 2009/0015559 A1 | * | 1/2009 | Day et al. | 345/167 |
| 2009/0207130 A1 | * | 8/2009 | Chen et al. | 345/156 |

* cited by examiner

*Primary Examiner* — Lun-yi Lao
*Assistant Examiner* — MD Saiful A Siddiqui

(57) ABSTRACT

A user input device includes an optical element comprising a finger interface surface, a light source in optical communication with the finger interface surface and configured to provide light from the light source to the finger interface surface, a sensor array configured to detect light reflected from the finger interface surface in response to contact between a finger and the finger interface surface, a navigation engine coupled to the sensor array, the navigation engine configured to generate lateral movement information, which is indicative of lateral movement of the finger relative to the sensor array, in response to the detected light, wherein the lateral movement information comprises first and second orthogonal components, and a quantization engine coupled to the navigation engine, the quantization engine configured to compare the first orthogonal component to the second orthogonal component and to generate first and second quantized orthogonal components in response to the comparison.

16 Claims, 11 Drawing Sheets

702 —

IF BOTH QX AND QY ENABLED
IF ABSOLUTE DY >= M* ABSOLUTE DX +C
    QY = DY/Y_Div_Factor, QX = 0
ELSE IF ABSOLUTE DY <= $M^{-1}$ * ABSOLUTE DX - C
    QX = DX/X_Div_Factor, QY = 0
ELSE
    QX = 0, QY = 0

IF ONLY QX ENABLED
    QX = DX/X_Div_Factor, QY= 0

IF ONLY QY ENABLED
    QY = DY/Y_Div_Factor, QX = 0

704 —

FINAL REPORTED MOTION
FINAL DX = QX
FINAL DY = QY

IF VERTICAL AND HORIZONTAL SCROLL MODE ENABLED
IF ABSOLUTE DY >= ABSOLUTE DX
       QY = DY/Y_Div_Factor, QX = 0
ELSE
       QX = DX/X_Div_Factor, QY = 0

IF ONLY HORIZONTAL SCROLL ENABLED
       QX = DX/X_Div_Factor, QY = 0

IF ONLY VERTICAL SCROLL ENABLED
       QY = DY/Y_Div_Factor, QX = 0

904

FINAL REPORTED MOTION INTO
SCROLL FIELD OF HOST SYSTEM:
  HORIZONTAL SCROLL COUNT = QX
  VERTICAL SCROLL COUNT = QY
  DX = 0
  DY = 0

FIG. 9

OPTICAL FINGER NAVIGATION UTILIZING QUANTIZED MOVEMENT INFORMATION

BACKGROUND

Optical finger navigation devices use a light source to illuminate a user's finger and a sensor array to generate digital images from light that is reflected off of the user's finger. Successive digital images are compared to each other to compute movement information. Typical optical finger navigation systems output two-dimensional movement information that represents the two-dimensional movement of the finger relative to the sensor array. The two-dimensional movement information is then used to move a cursor on a display of a corresponding computing device.

While optical finger navigation devices can be used to move a cursor on a display, the graphical user interface of many computing devices, such as personal computers, telephones, smart phones, and personal digital assistants (PDAs), require functionality other than cursor movement. For example, many graphical user interfaces require scrolling functionality or four-way rocker functionality. Scrolling functionality is commonly provided using a mechanical scroll and/or tilt wheel and four-way rocker functionality is commonly provided using a mechanical four-way rocker with activation switches at four distinct locations.

While optical finger navigation devices can support two-dimensional navigation of a cursor within a graphical user interface, there is a need for optical finger navigation devices to support the scrolling and four-way rocker functionality that is commonly provided by mechanical scroll wheels and four-way rockers.

SUMMARY

In an embodiment, components of movement information from an optical finger navigation device are quantized and the quantized movement information is used to implement scrolling or four-way rocker functionality. For example, quantizing movement information involves determining whether the two-dimensional movement represented by the movement information is primarily in the x direction or primarily in the y direction and then reducing the two-dimensional movement information to movement information that indicates one-dimensional movement in the primary direction.

In one embodiment, a user input device includes an optical element comprising a finger interface surface, a light source in optical communication with the finger interface surface and configured to provide light from the light source to the finger interface surface, a sensor array configured to detect light reflected from the finger interface surface in response to contact between a finger and the finger interface surface, a navigation engine coupled to the sensor array, the navigation engine configured to generate lateral movement information, which is indicative of lateral movement of the finger relative to the sensor array, in response to the detected light, wherein the lateral movement information comprises first and second orthogonal components, and a quantization engine coupled to the navigation engine, the quantization engine configured to compare the first orthogonal component to the second orthogonal component and to generate first and second quantized orthogonal components in response to the comparison.

In another embodiment, a method for optical finger navigation involves generating light at a light source, directing the light to a finger interface surface, detecting light reflected from the finger interface surface toward a sensor array in response to finger contact at the finger interface surface, generating lateral movement information, which is indicative of lateral movement of the finger relative to the sensor array, in response to the detected light, wherein the lateral movement information comprises first and second orthogonal components, comparing the first orthogonal component to the second orthogonal component, and generating first and second quantized orthogonal components in response to the comparison.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 7 illustrates pseudo code for implementing quantization of two-dimensional movement information with a gray area.

FIG. 9 depicts pseudo code for implementing a scrolling function using an optical finger navigation device with a quantization engine as described above.

Throughout the description, similar reference numbers may be used to identify similar elements.

DETAILED DESCRIPTION

Figure 1:
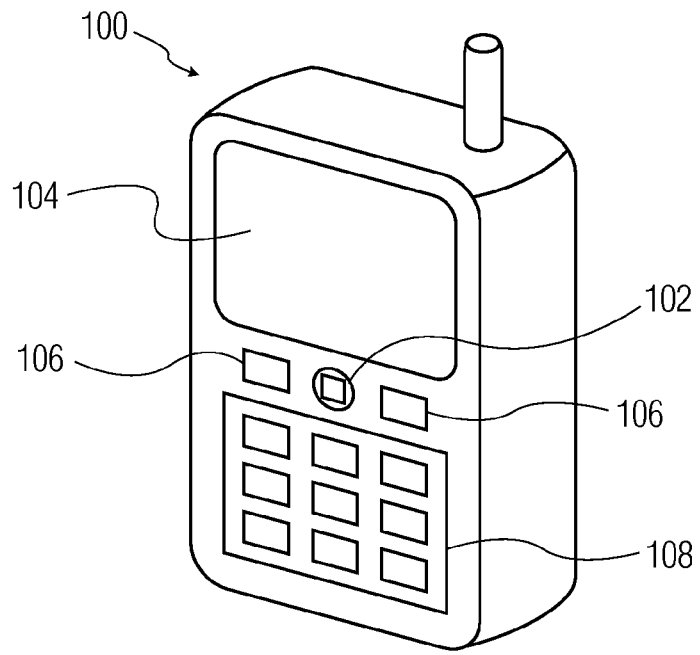
FIG. 1 depicts a hand-held computing device that includes an optical finger navigation device as a user input device.

FIG. 1 depicts a hand-held computing device 100 that includes an optical finger navigation device 102 as a user input device. The optical finger navigation device and corresponding optical finger navigation techniques are described in more detail below. The hand-held computing device also includes a display device 104, function keys 106, and an alphanumeric keypad 108. The hand-held computing device provides a graphical user interface on the display device and the optical finger navigation device is used to navigate within the graphical user interface. Although a particular hand-held computing device is depicted as an example of a computing device that could utilize an optical finger navigation device, an optical finger navigation device can be used within other types of computing devices, such as laptop computers, desktop computers, smart phones, global positioning system (GPS) devices, personal music players, and PDAs.

The optical finger navigation device 102 facilitates user input to navigate content on the display device 104 of the hand-held computing device 100. For example, the optical finger navigation device facilitates control of a navigation indicator within a graphical user interface that is displayed on the display device. The navigation indicator may be a cursor, a highlighter, an arrow, or another type of navigation indicator. Additionally, the user input received through the optical finger navigation device may facilitate other types of user-controlled functionality including, but not limited to, volume controls, audio playback selections, browser controls, and so forth. The type of user-controlled functionality that may be implemented with embodiments of the optical finger navigation device depends on the type of functionality generally provided by the hand-held computing device. Also, although FIG. 1 specifically illustrates a hand-held computing device, the optical finger navigation device may be used in electronic devices which are portable, but not necessarily held in a user's hand, or devices which are generally considered to be not portable.

Figure 2:
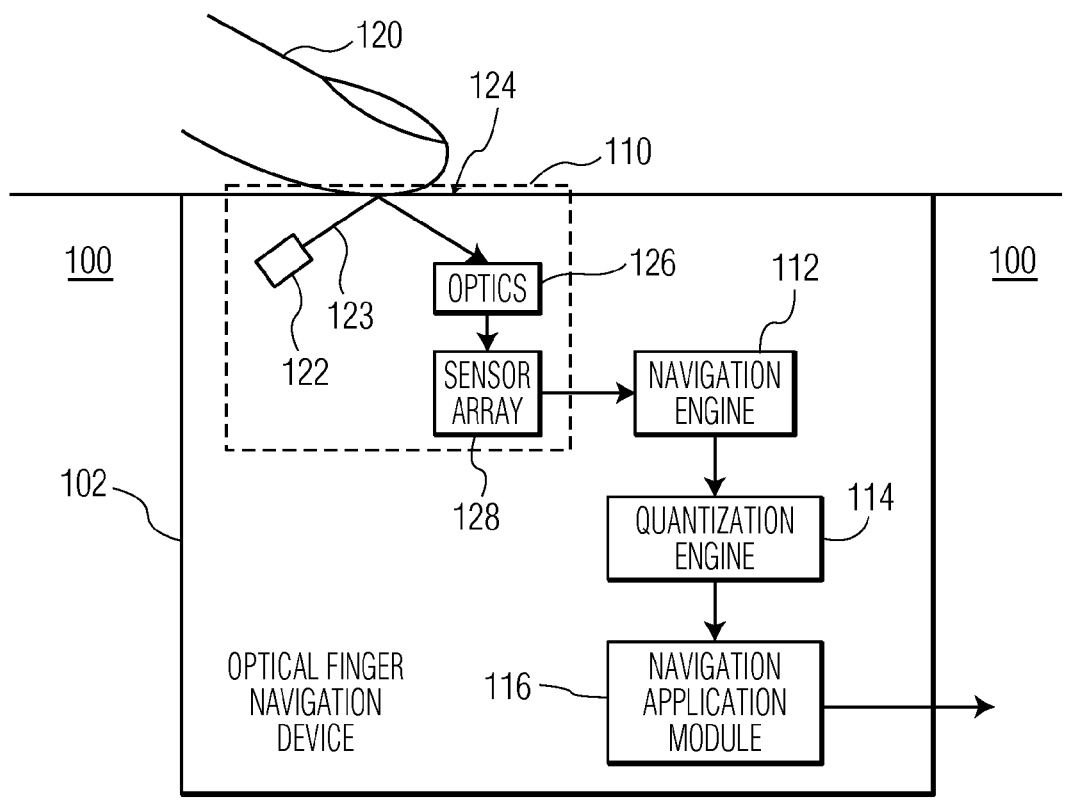
FIG. 2 depicts a functional block diagram of an embodiment of an optical finger navigation device such as the optical finger navigation device depicted in FIG. 1.

FIG. 2 depicts a functional block diagram of an embodiment of an optical finger navigation device 102 such as the optical finger navigation device depicted in FIG. 1. The optical finger navigation device of FIG. 2 includes an imaging system 110, a navigation engine 112, a quantization engine 114, and a navigation application module 116. The imaging system is configured to collect image information related to a finger 120 and includes a light source 122, a finger interface surface 124, imaging optics 126, and a sensor array 128.

The light source 122 of the imaging system 110 can be any suitable source of electromagnetic radiation. By way of example, but not limitation, the light source can be a single light emitting diode (LED), multiple LEDs arranged to illuminate different portions of the finger interface surface, an array of LEDs designed to emit light 123 at a desired average intensity, or a laser light source. In an embodiment, the wavelength of light emitted from the light source is selected to maximize reflection of the light from human skin and to enable the reflected light to be distinguished from unwanted light signals. In addition, the wavelength of the light can be chosen based on user or manufacturer preferences. For example, some manufacturers may prefer blue light to red light in certain applications. The light source can be, for example, in an "on state" in a continuous mode with either a steady or variable amount of illumination or in a duty-cycle mode, where the light source is pulsed on and off to control the exposure by servoing the average amount of light. The intensity of illumination can be controlled using any known technique.

The finger interface surface 124 of the imaging system 110 is formed from a transparent optical element such as glass or plastic that is of a size sufficient to enable the optical finger navigation device 102 to capture an image of at least a portion of the finger 120. In one embodiment, the finger interface surface provides a sensing area of approximately 16 mm$^2$.

Using the axes shown in FIG. 1, in one embodiment, the finger interface surface is approximately 4 mm in the x-direction by 4 mm in the y-direction. As shown in FIG. 1, the user's finger is positioned on the finger interface surface with the length of the finger from the finger tip to the base of the finger oriented approximately along the y-axis and the width of the finger across the sides of the finger oriented approximately along the x-axis.

Illumination optics (not shown) can also be used to direct the light from the light source 102 towards the finger interface surface 124 at the desired angle of incidence. For example, illumination optics could consist of LED dome lenses or a light pipe that channels the light towards the finger interface surface with a minimal amount of light loss. In an embodiment, the angle of incidence for illuminating opaque material is a grazing angle within the range of five to twenty degrees. An angle of incidence in this range provides a high signal-to-noise ratio of image data representing inherent structural features of the object (e.g., a finger) being imaged. However, due to the transparency of skin, such oblique angles may not be necessary for adequately capturing image data representing an image of the user's finger. Therefore, the selection of the angle of incidence is largely dependent upon the design of the image acquisition device, such as the number and type of LEDs used, the thickness of the imaging system in the z-direction and the optics (illumination and imaging system) employed. In addition, in other embodiments, depending on the angle of incidence, the light may be directed to the finger interface surface using a total internal reflection (TIR) mechanism or a reflected light mechanism.

The imaging optics 126 of the imaging system 110 direct and focus reflected light onto the sensor array 128. The imaging optics may include a lens, lenses, and/or a light pipe. In alternative embodiments, other imaging optics may be utilized and in still other embodiments, imaging optics may not be used.

The sensor array 128 of the imaging system 110 generates frames of image data from light that is reflected at the finger interface surface 124 and incident on the sensor array. In an embodiment, the sensor array includes an array of distinct photodetectors (not shown), for example, a 16×16 or 32×32 array of distinct photodetectors configured to detect light that is reflected from an illuminated spot on a finger at the finger interface surface. Each of the photodetectors in the sensor array generates light intensity information that is output as a digital value (e.g., an 8-bit digital pixel value). Image information is captured by the sensor array in frames, where a frame of image information includes a set of simultaneously captured values for each distinct photodetector in the sensor array. Image frames captured by the sensor array include data that is indicative of features on the finger. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

In an embodiment, each photodetector of the sensor array 128 has a photo sensitive region between 5 and 60 μm square, with the spacing between the photodetectors designed to achieve the desired spatial resolution of the sensor array. Regardless of the desired spatial resolution, the size of the photodetectors and the spacing between the photodetectors are configured to provide at least one, and preferably more than one, photodetector per image feature and the overall size of the photodetector array is made large enough to receive an image having several features.

The sensor array 128 provides image information (e.g., raw pixel values) to the navigation engine 112. The navigation engine is configured to output two-dimensional movement information in response to the image information from the sensor array. The two-dimensional movement information is indicative of lateral movement of the finger 120 relative to the sensor array and includes two orthogonal components, e.g., an x-axis component and a y-axis component. The x-axis component is indicative of relative movement in the x direction and the y-axis component is indicative of relative movement in the y direction. In an embodiment, the navigation engine compares successive image frames from the sensor array to determine the movement of image features between frames. In particular, the navigation engine determines movement by correlating common features that exist in successive image frames. The movement between image frames is expressed in terms of movement vectors in, for example, the x and y directions (e.g., DX and DY). The movement vectors are then used to determine the lateral movement of a finger relative to the sensor array. More detailed descriptions of exemplary navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Although the optical finger navigation device 102 is described as being controlled by a finger 120, other body parts, such as a thumb, a toe, or a tongue, could be used to control navigation. Additionally, other non-human objects, such as a glove or a pencil erasure could be used to control navigation.

In many user input devices, the user input is a discrete action that corresponds to a discrete function. For example, with a scroll wheel, spinning the scroll wheel triggers vertical axis scrolling and tilting the scroll wheel triggers horizontal axis scrolling and with a four-way rocker device, pressing the top side of the rocker triggers a vertical step up, pressing the bottom side of the rocker triggers a vertical step down, pressing the right side of the rocker triggers a horizontal step to the right, and pressing the left side of the rocker triggers a horizontal step to the left.

In the optical finger navigation device 102 of FIG. 2, scrolling and four-way rocker functionality is implemented based on vertical and horizontal movements of the user's finger 120 relative to the optical finger navigation device. However, it is often difficult for a user to make a perfectly vertical or perfectly horizontal movement relative to the optical finger navigation device. The quantization engine 114 is used to determine the intention of user inputs. That is, the quantization engine determines whether a user intended to make a vertical movement or a horizontal movement as a user input.

In an embodiment, the quantization engine 114 is configured to quantize the x and y components of the movement information, DX and DY, which is generated by the navigation engine 112, and to output quantized movement information. For example, the quantization engine compares the x-axis component of the movement information, DX, to the y-axis component of the movement information, DY, and generates quantized movement information in the form of x-axis and y-axis components, in response to the comparison. In an embodiment, the quantization engine takes movement information that indicates two-dimensional movement, e.g., movement along both the x-axis and the y-axis, and reduces the movement information down to movement information that indicates one-dimensional movement, e.g., movement along either the x-axis or the y-axis. In particular, the quantization engine determines whether the movement represented by the two-dimensional movement information is primarily in the x direction or primarily in the y direction and then reduces the two-dimensional movement information to movement information that indicates one-dimensional movement in the primary direction. In other words, two-dimensional movement information obtained from the navigation engine of the optical finger navigation device is "quantized" into one-dimensional movement information that is representative of the primary direction of finger movement. As is described in more detail below, quantized movement information is useful in implementing scrolling and four-way rocker functionality in optical finger navigation devices.

Figure 3A:
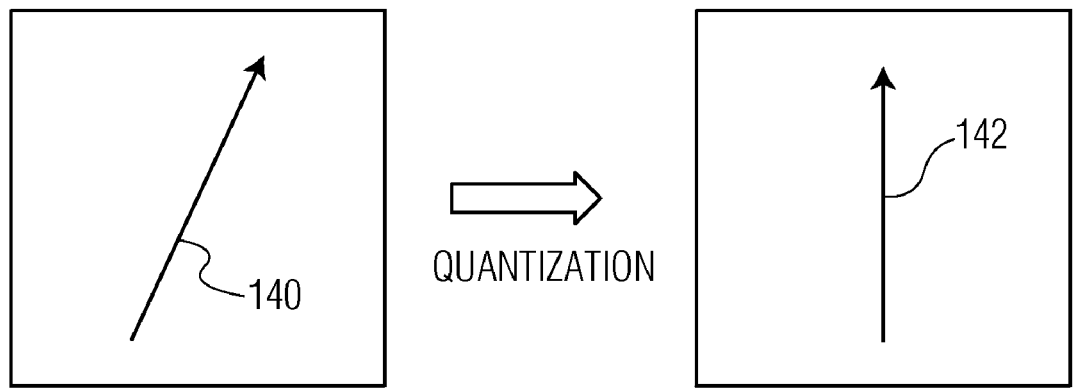
FIG. 3A illustrates the quantization of movement information that represents movement primarily in the y-axis, e.g., vertical movement.

FIG. 3A illustrates the quantization of movement information that represents movement primarily in the y-axis, e.g., vertical movement. The left side of FIG. 3A depicts a movement vector 140 that is greater in the y direction than in the x direction. To quantize the movement information, the magnitude of the y-axis movement is compared to the magnitude of the x-axis movement and whichever direction has the largest movement is considered to be the primary axis of movement and the intended direction of movement of the user. In the example of FIG. 3A, since the magnitude of the movement vector in the y direction is greater than the magnitude of the movement vector in the x direction, the movement vector is considered to represent a movement that is primarily in the y direction. Once the primary direction of movement is determined, the quantization process involves reducing the magnitude of movement along the secondary axis of movement to zero, or effectively zero. In the example, of FIG. 3A, the x-axis movement is reduced to zero, or effectively zero, and the quantized movement information represents the full extent of the y direction movement and zero x direction movement. The right side of FIG. 3A depicts the quantized movement vector 142 that is generated from the movement vector on the left side of FIG. 3A. The quantized movement vector indicates one-dimensional movement in the y direction.

Figure 3B:
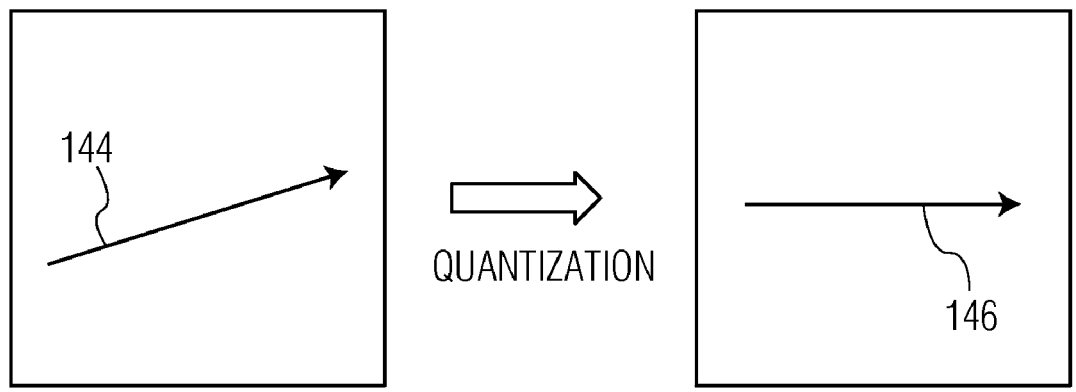
FIG. 3B illustrates the quantization of movement information that represents movement primarily in the x-axis, e.g., horizontal movement.

FIG. 3B illustrates the quantization of movement information that represents movement primarily in the x-axis, e.g., horizontal movement. The left side of FIG. 3B depicts a movement vector 144 that is greater in the x direction than in the y direction. Again, to quantize the movement information, the magnitude of the y-axis movement is compared to the magnitude of the x-axis movement and whichever direction has the largest movement is considered to be the primary axis of movement and the intended direction of movement of the user. In the example of FIG. 3B, since the magnitude of the movement vector in the x direction is greater than the magnitude of the movement vector in the y direction, the movement vector is considered to represent a movement that is primarily in the x direction. Once the primary direction of the movement is determined, the quantization process involves reducing the magnitude of movement along the secondary axis of movement to zero, or effectively zero. In the example, of FIG. 3B, the y-axis movement is reduced to zero, or effectively zero, and the quantized movement information represents the full extent of the x direction movement and zero y direction movement. The right side of FIG. 3B depicts the quantized movement vector 146 that is generated from the movement vector on the left side of FIG. 3B. The quantized movement vector indicates one-dimensional movement in the x direction.

Figure 4:
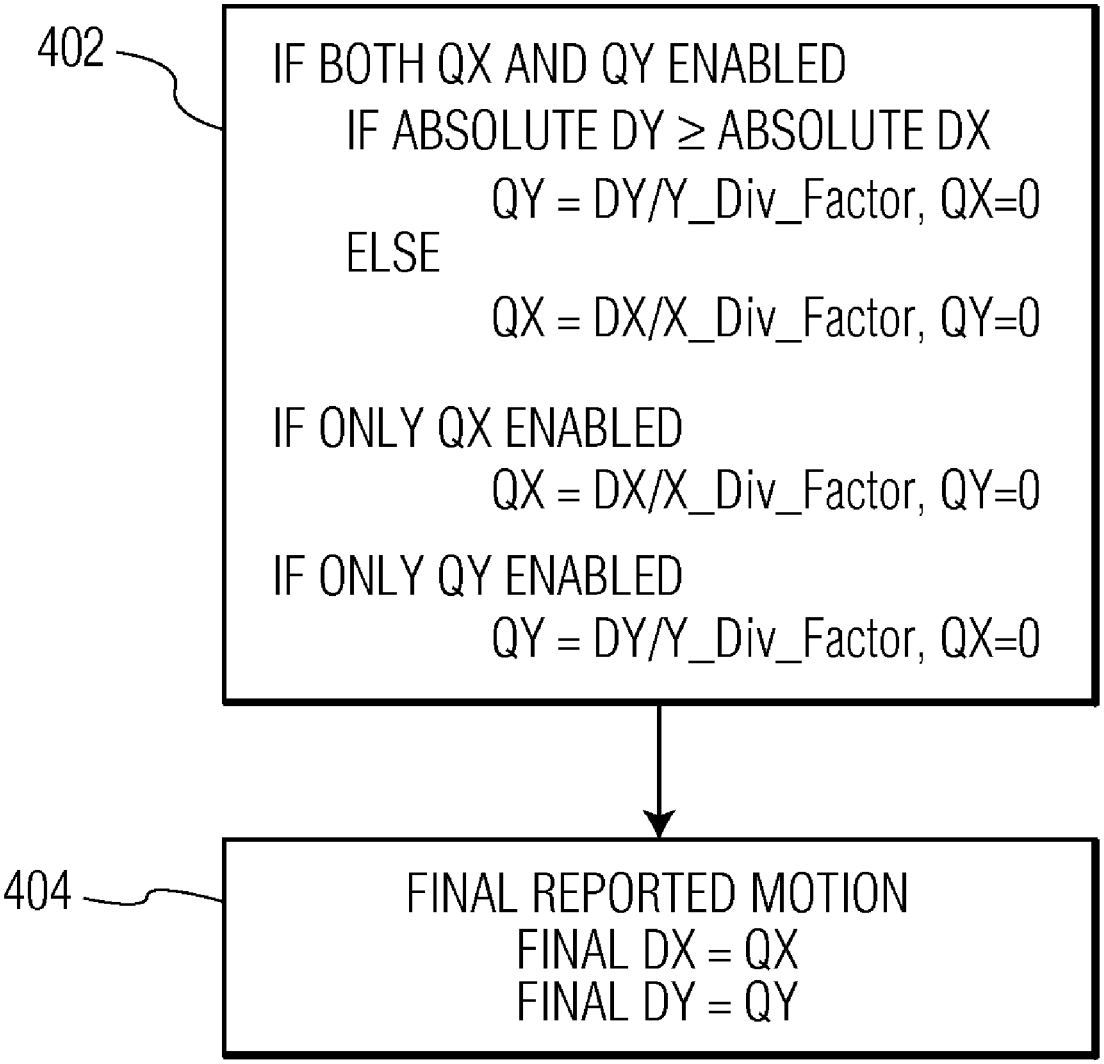
FIG. 4 illustrates pseudo code for implementing quantization of two-dimensional movement information.

In some embodiments, quantization can be performed in both the x-axis and the y-axis and in other embodiments, quantization can be limited to either the x-axis or the y-axis. FIG. 4 illustrates pseudo code for implementing quantization of two-dimensional movement information where lateral movement information along the x-axis is identified as DX, lateral movement information along the y-axis is identified as DY, quantized x-axis movement information is identified as QX, and quantized y-axis movement information is identified as QY. As indicated in block 402 of FIG. 4, if both x-axis and y-axis quantization is enabled, then the absolute value of DY is compared to the absolute value of DX. If the absolute value of DY is greater than or equal to the absolute value of DX, then QY is equal to DY divided by a y-axis division factor (Y_Div_Factor) and QX is equal to zero. If, on the other hand, the absolute value of DY is not greater than or equal to the absolute value of DX, then QX is equal to DX divided by an x-axis division factor (X_Div_Factor) and QY is equal to zero. If only x-axis quantization is enabled, then QX is equal to DX divided by the x-axis division factor and QY is equal to zero. If only y-axis quantization is enabled, then QY is equal to DY divided by the y-axis division factor and QX is equal to zero. At block 404, the final quantized movement information is generated and reported based on which quantization feature is enabled.

As described above, the quantization engine 114 is used to determine whether the user intended to make a vertical movement or a horizontal movement. If the x and y components of the two-dimensional movement information are relatively close to each other, or exactly the same, it can be difficult to determine the intention of the user input. In an embodiment, the quantization engine is configured to identify a window (referred to herein as a "gray area") in which two-dimensional movement information is considered to be not sufficiently vertical or sufficiently horizontal to determine the user's intention. Two-dimensional movement information that falls outside the gray area is reduced to one-dimensional movement information in either the x direction or the y direction depending on which side of the gray area the movement falls and movement information that falls within the gray area is reduced to movement information that indicates no movement, e.g., QX=QY=0. Reporting no movement in response to movement information that falls within the gray area can help to train a user to avoid user inputs that are not sufficiently vertical or sufficiently horizontal to determine the user's intention.

Figure 5:
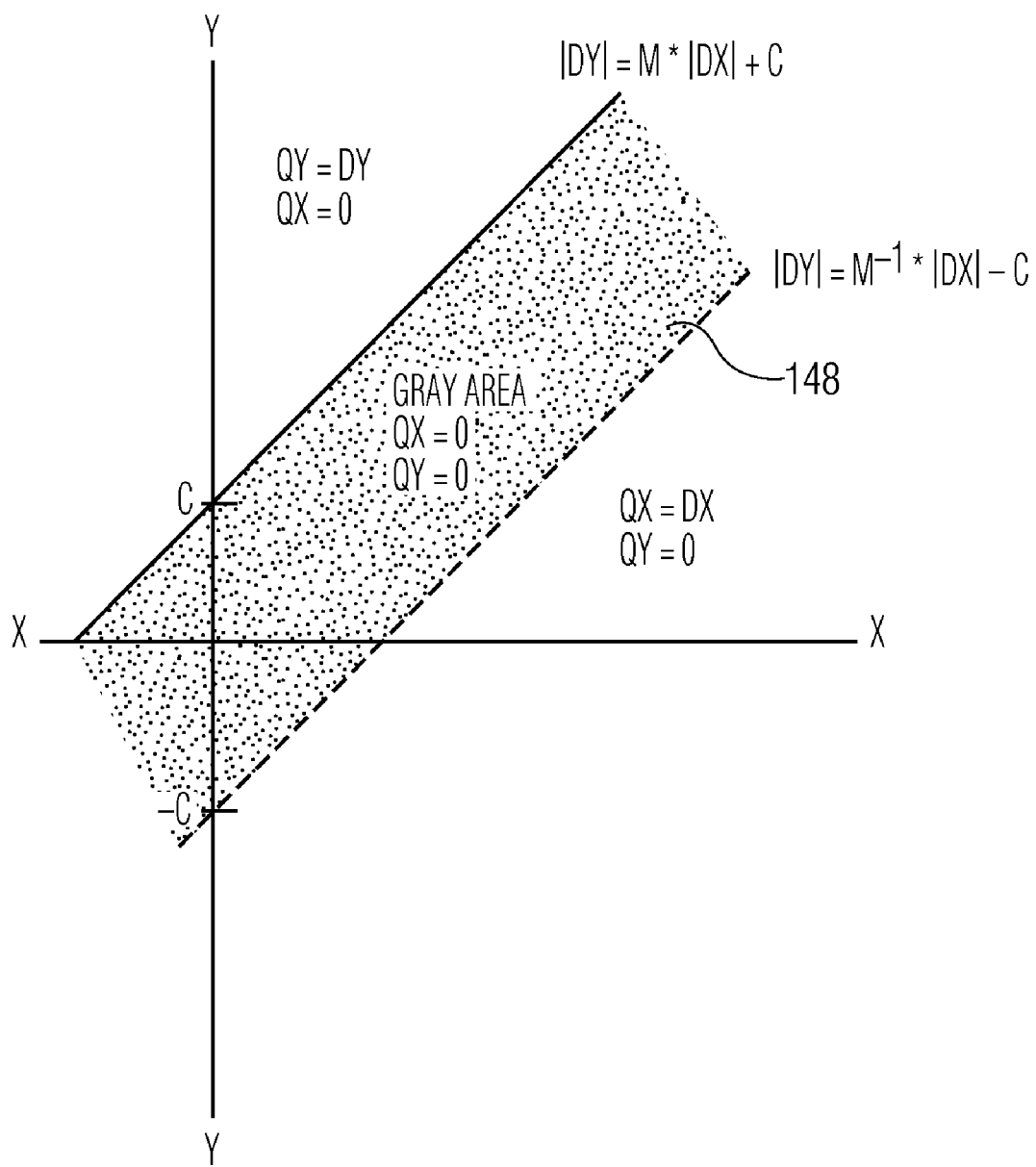
FIG. 5 illustrates a gray area relative to x and y coordinates of a movement information graph.

FIG. 5 illustrates a gray area 148 relative to x and y coordinates of a movement information graph. In FIG. 5, the boundaries of the gray area are defined based on a linear function, $|DY|=M*|DX|+C$, where $|DY|$ is the magnitude of the absolute movement in the y direction, $|DX|$ is the magnitude of the absolute movement in the x direction, M is a gradient or slope, and C is the y intercept. FIG. 5 illustrates the case where M=1. In the example of FIG. 5, the x direction movement is reduced to zero if the absolute y direction movement, DY, is greater than or equal to $M*|DX|+C$, the y direction movement is reduced to zero if the absolute y direction movement, DY, is less than $M^{-1}*|DX|-C$, and both the x direction movement and the y direction movement are reduced to zero if the movement falls within the gray area.

Figure 6:
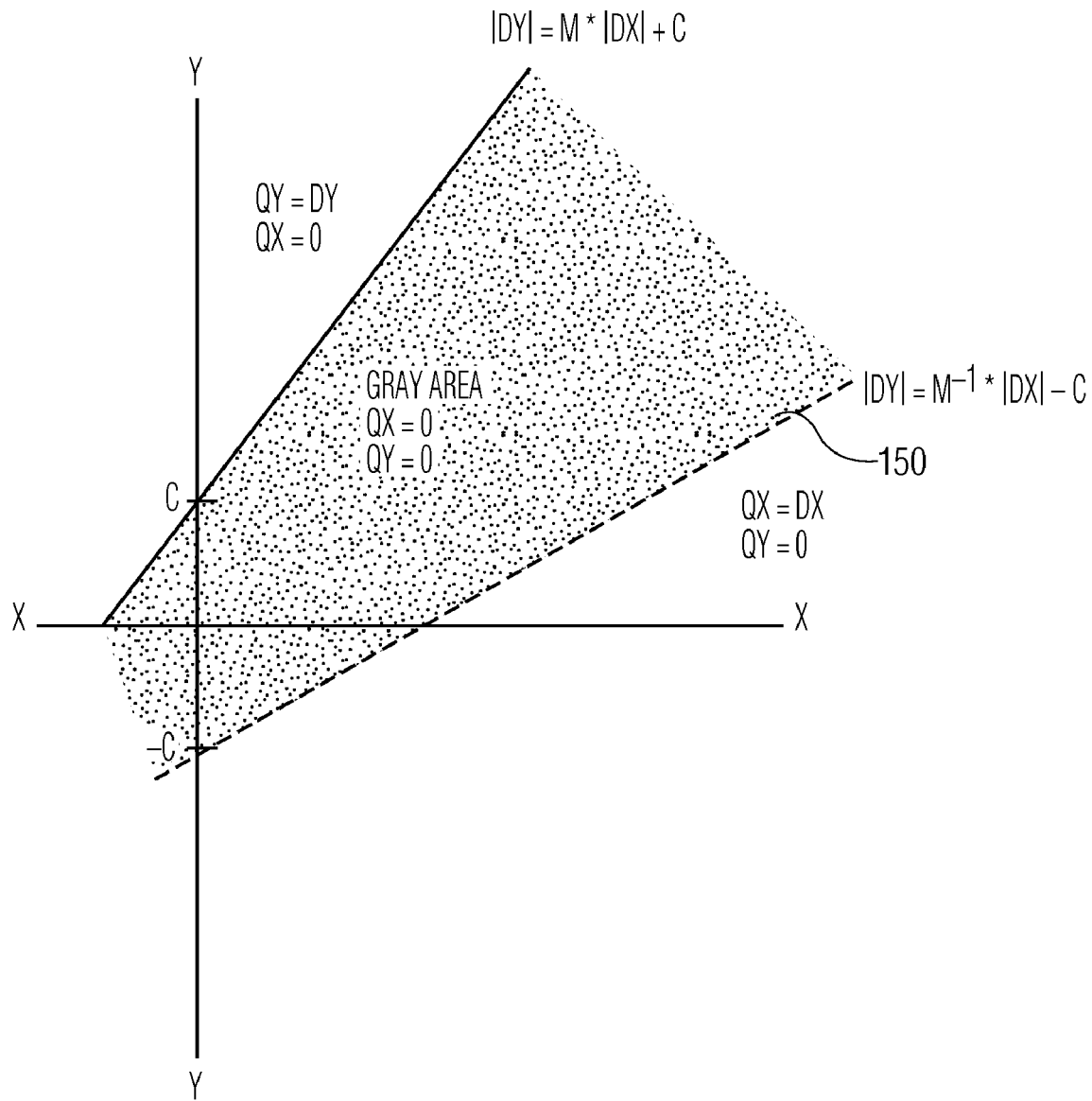
FIG. 6 illustrates a gray area that is larger than the gray area of FIG. 5.

In an embodiment, the parameters of the gray area are configurable and can be adjusted by changing the gradient M and/or the y intercept, C. FIG. 6 illustrates a gray area 150 that is larger than the gray area of FIG. 5. In the example of FIG. 6, the gray area is expanded by changing the gradient, M, to M=2 instead of M=1.

FIG. 7 illustrates pseudo code for implementing quantization of two-dimensional movement information with a gray area. As indicated in block 702 of FIG. 7, if both x-axis and y-axis quantization is enabled, then DY is compared to $M*|DX|+C$. If the absolute value of DY is greater than or equal to $M*|DX|+C$, then QY is equal to DY divided by the y-axis division factor (Y_Div_Factor) and QX is equal to zero. If the absolute value of DY is less than $M^{-1}*|DX|-C$, then QX is equal to DX divided by the x-axis division factor (X_Div_Factor) and QY is equal to zero. If only x-axis quantization is enabled, then QX is equal to DX divided by the x-axis division factor and QY is equal to zero. If only y-axis quantization is enabled, then QY is equal to DY divided by the y-axis division factor and QX is equal to zero. At block 704, the final quantized movement information is generated and reported based on which quantization feature is enabled.

Figure 8:
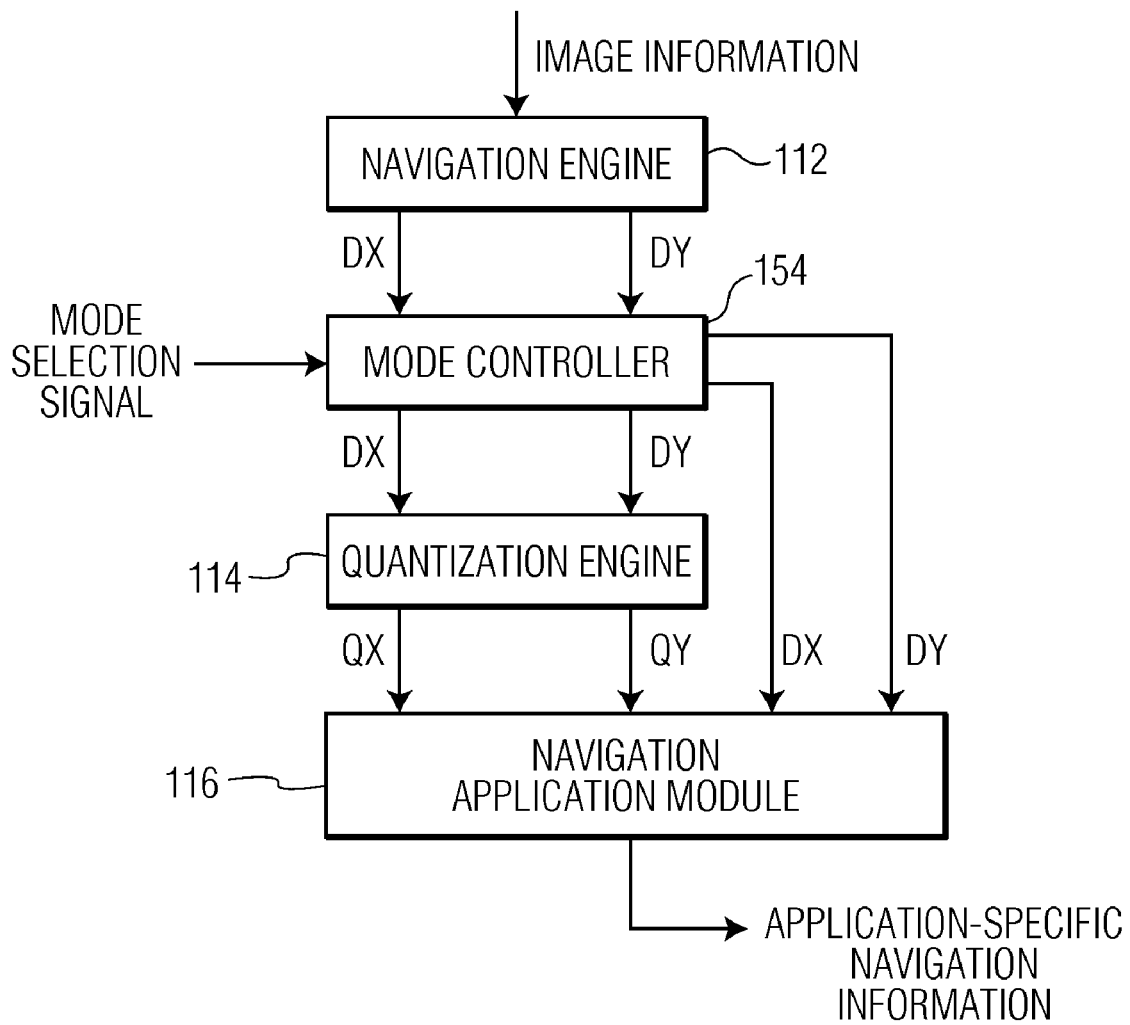
FIG. 8 illustrates an embodiment of the flow of information relative to the navigation engine, the quantization engine, and the navigation application module of FIG. 2.

FIG. 8 illustrates an embodiment of the flow of information relative to the navigation engine 112, the quantization engine 114, and the navigation application module 116 of FIG. 2. As illustrated in FIG. 8, image information is provided to the navigation engine and the navigation engine generates two-dimensional movement information from the image information. As described above, the navigation engine generates x-axis movement information, DX, and y-axis movement information DY, which represents the two-dimensional movement of a finger relative to the sensor array.

A mode controller 154 controls whether the movement information is provided directly to the navigation application module 116 for navigation, e.g., for 360 degree lateral navigation of a cursor, or whether the movement information is to be quantized by the quantization engine 114. If a mode selection signal indicates that the movement information is to be used directly for navigation, then the two-dimensional movement information is provided directly to the navigation application module. If the mode selection signal indicates that the movement information is to be quantized before being used, then the two-dimensional movement information is provided to the quantization engine.

The quantization engine 114 generates quantized movement information as described above and provides the quantized movement information, QX and QY, to the navigation application module 116. The navigation application module uses the quantized movement information to implement a navigation function such as a scroll function or a four-way rocker function. Examples of how quantified movement information is used to implement scroll and four-way rocker functionality are described below with reference to FIGS. 9-14.

Use of quantized movement information to implement scroll functionality is now described with reference to FIGS. 9 and 10. FIG. 9 depicts pseudo code for implementing a scrolling function using an optical finger navigation device with a quantization engine. As indicated in block 902 of FIG. 9, if both vertical scrolling (y-axis) and horizontal scrolling (x-axis) are enabled, then DY is compared to DX. If the absolute value of DY is greater than or equal to the absolute value of DX, then QY is equal to DY divided by the y-axis division factor (Y_Div_Factor) and QX is equal to zero. If, on the other hand, the absolute value of DY is not greater than or equal to the absolute value of DX, then QX is equal to DX divided by the x-axis division factor (X_Div_Factor) and QY is equal to zero. If only horizontal scrolling (x-axis) is enabled, then QX is equal to DX divided by the x-axis division factor and QY is equal to zero. If only vertical scrolling (y-axis) is enabled, then QY is equal to DY divided by the y-axis division factor and QX is equal to zero. At block 904, the final horizontal and vertical scroll counts are generated and reported to a scroll application based on which scroll feature is enabled. The scroll application then uses the scroll count(s) to implement a scroll function in a graphical user interface of the computing device. In an embodiment, the amount of scrolling applied to the graphical user interface is a function of the magnitude of the scroll count(s).

Scrolling functionality using an optical finger navigation device can be enhanced by implementing advanced scrolling features such as variable magnitude scrolling and continuous scrolling. In an embodiment, continuous scrolling is implemented using a scroll threshold, which if exceeded by the quantized scroll count, triggers continuous scrolling within the graphical user interface. In an alternative embodiment, exceeding the scroll threshold triggers the scroll count to be set at a fixed scroll count, where the magnitude of the fixed scroll count can be configurable. In another alternative embodiment, the scroll count can be set depending on the magnitude of the quantized movement information such that the speed of the continuous scrolling is a function of the magnitude of the swipe. Continuous scrolling can be stopped using, for example, a mechanical button or a user input via the optical finger navigation device. In an embodiment, continuous scrolling can be stopped by tapping on the finger interface surface of the optical finger navigation device. In one embodiment, a tap event is detected in response to changes in the shutter speed of the sensor array, where the shutter speed is automatically adjusted to account for current light conditions at the sensor array and in another embodiment, a tap event is detected in response to a measure of the quality of the image data generated from the sensor array. Examples of techniques for detecting a tap or "click" event in an optical finger navigation device are described in U.S. Pat. No. 7,313,255, which is assigned to the assignee of the current application and incorporated by reference herein.

Figure 10:
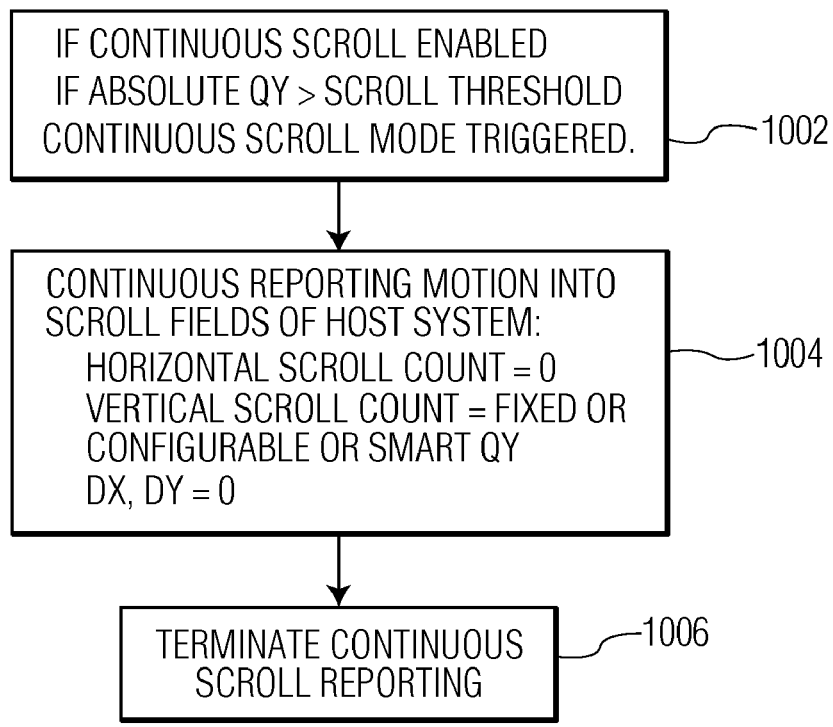
FIG. 10 illustrates pseudo code for implementing advanced scrolling features such as variable magnitude scrolling and continuous scrolling in an optical finger navigation device.

FIG. 10 illustrates pseudo code for implementing advanced scrolling features such as variable magnitude scrolling and continuous scrolling. At block 1002, if continuous vertical scrolling is enabled, the absolute value of quantized movement information, e.g., QY, is compared to a scroll threshold. If the quantized movement information exceeds the scroll threshold, then a continuous scrolling mode is triggered. At block 1004, if the continuous scrolling mode is triggered, then a scroll count is continuously reported into the appropriate field. For example, in vertical scrolling, the vertical scroll count is continuously reported as a fixed value, a continuous value, or a "smart" value (which controls the speed of the continuous scrolling). Additionally, the movement information components DX and DY are reported as zero. At block 1006, continuous scrolling is terminated, for example, by a mechanical button click or a tap input to the optical finger navigation device.

Figure 11:
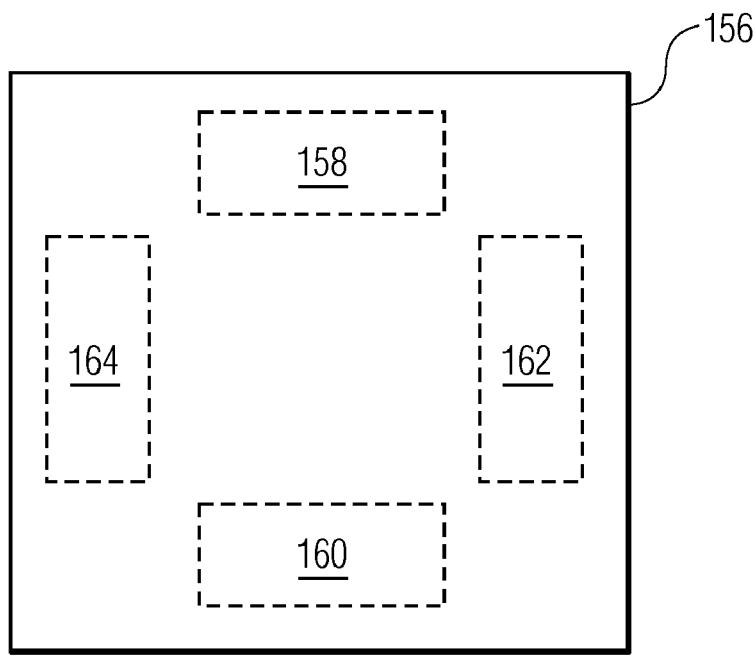
FIG. 11 depicts a mechanical four-way rocker pad that is used to implement four-way rocker functionality.

Use of quantized movement information to implement four-way rocker functionality is now described with reference to FIGS. 11-14. FIG. 11 depicts a mechanical four-way rocker pad 156 that is used to implement four-way rocker functionality. In the example of FIG. 11, step-wise movements in the "up" direction are triggered by applying pressure in the top region 158 of the four-way rocker pad, step-wise movements in the "down" direction are triggered by applying pressure in the bottom region 160 of the four-way rocker pad, step-wise movements in the "right" direction are triggered by applying pressure in the right region 162 of the four-way rocker pad, and step-wise movements in the "left" direction are triggered by applying pressure in the left region 164 of the four-way rocker pad.

Figure 12:
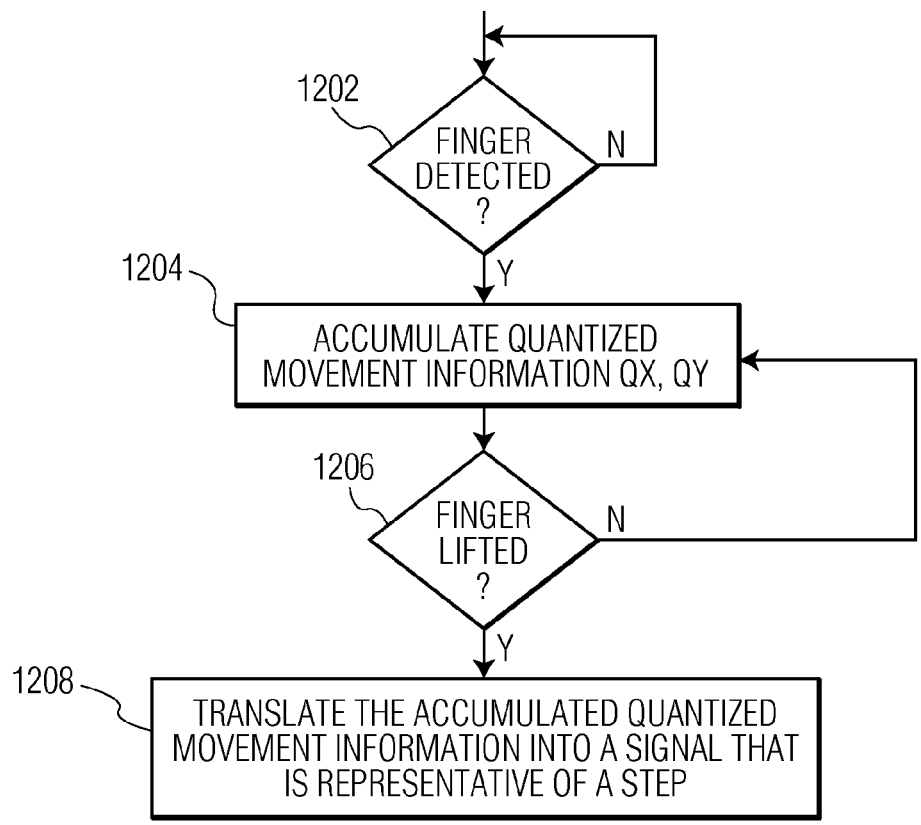
FIG. 12 is a process flow diagram of a method for implementing four-way rocker functionality in an optical finger navigation device using quantized movement information, QX and QY.

In an embodiment, the functions of the mechanical four-way rocker pad 156 of FIG. 11 are emulated in an optical finger navigation device by accumulating quantized movement information and translating the quantized movement information into signals that are indicative of a step in a specific direction. FIG. 12 is a process flow diagram of a method for implementing four-way rocker functionality in an optical finger navigation device using quantized movement information, QX and QY. At decision point 1202, it is determined whether or not a finger is detected at or near the finger interface surface of an optical finger navigation device. If a finger is detected at or near the finger interface surface, then at block 1204 quantized movement information is accumulated. At decision point 1206, it is determined whether or not the finger has been lifted from the finger interface surface. As long as the finger has not been lifted from the finger interface surface, quantized movement information continues to be accumulated. Once the finger is lifted from the finger interface surface, at block 1208 the accumulated quantized movement information is translated into a signal that is representative of a step in a four-way rocker application. The direction of the step is determined by the quantized movement information. For example, if;

QX=0 and
QY=positive, then up step, or if;
QX=0 and
QY=negative, then down step, or if;
QX=positive and
QY=0, then right step, or if;
QX=negative and
QY=0, then left step.

Figure 13:
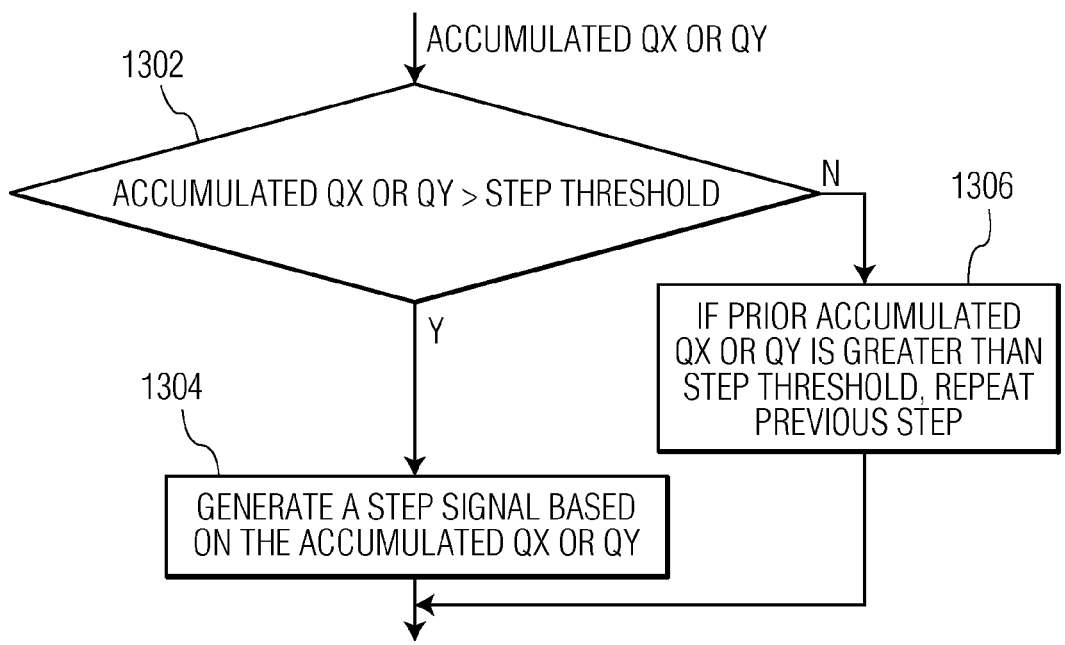
FIG. 13 is a process flow diagram of a technique for implementing four-way rocker functionality in an optical finger navigation device that is dependent on the magnitude a user swipe across the optical finger navigation device.

The four-way rocker functionality can be enhanced by implementing continuous stepping in response to a particular user input. In an embodiment, continuous stepping is implemented by correlating the magnitude of a directional swipe to the stepping functionality. For example, continuous stepping can be triggered by the user making a sufficiently large swipe (as indicated by the magnitude of the accumulated quantized movement information) across the optical finger navigation device. FIG. 13 illustrates a process flow diagram of a technique for implementing four-way rocker functionality that is dependent on the magnitude the user swipe across the optical finger navigation device (as indicated by the magnitude of the accumulated quantized movement information). At decision point 1302, it is determined whether or not accumulated quantized movement information (i.e., QX and QY) has exceeded a pre-established step threshold, where the accumulated quantized movement information is the movement information that is accumulated up until the user's finger is lifted from the finger interface surface. If the step threshold has been exceeded, then at block 1304 a step signal, which indicates a single step or multiple steps, is generated based on the accumulated quantized movement information. If the step threshold has not been exceeded, then at block 1306 a signal is generated that repeats a previous step signal as long as the previous accumulated quantized movement information was above the step threshold.

Figure 14:
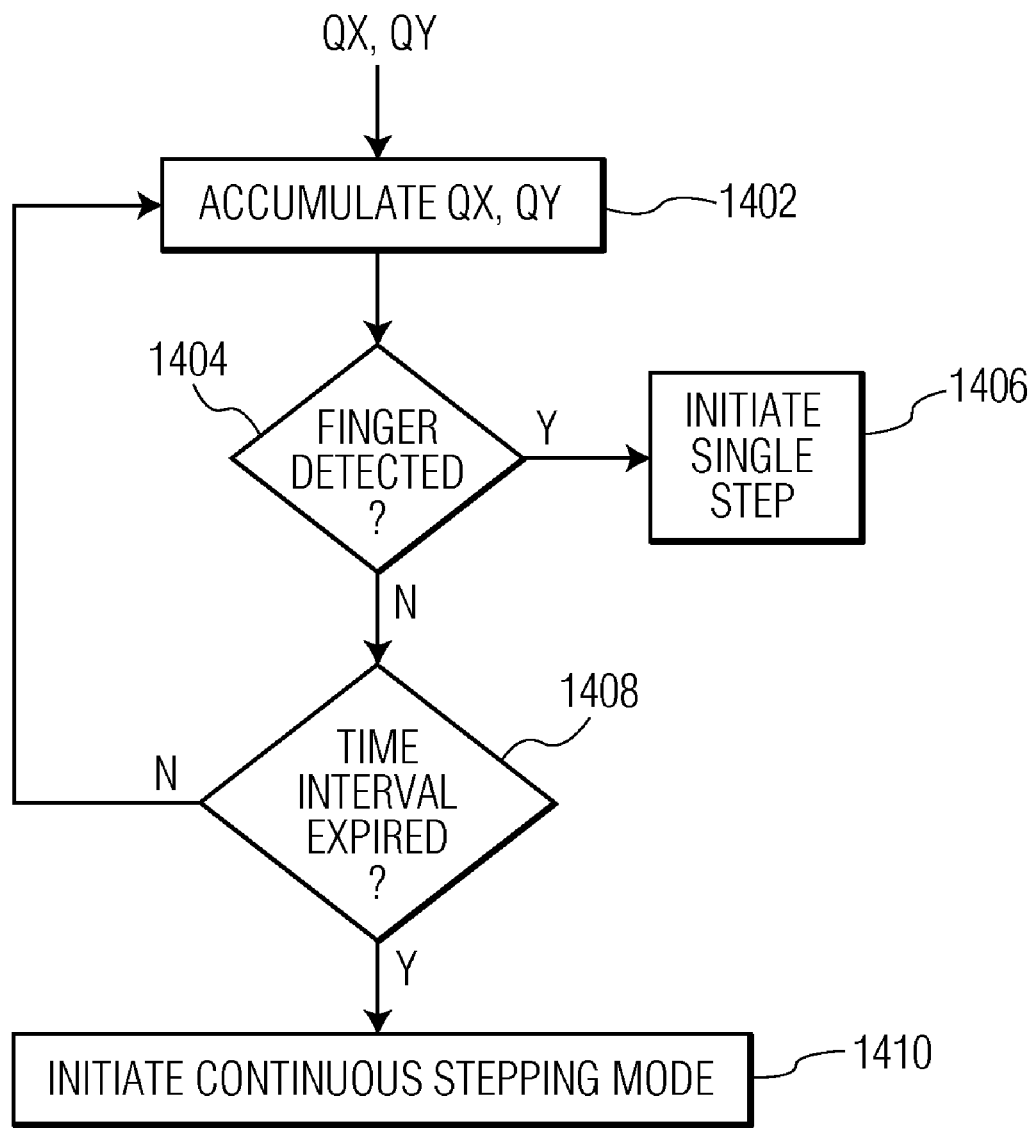
FIG. 14 is a process flow diagram of a method for implementing continuous stepping in an optical finger navigation device using quantized movement information.

In an embodiment of the four-way rocker application, the magnitude of the accumulated quantized movement information can be used to adjust the number of steps. In another embodiment of the four-way rocker application, continuous stepping is implemented by a "tap and hold" user input to the optical finger navigation device. In the "tap and hold" application, continuous scrolling is triggered by the user making a movement in a particular direction and keeping a finger on the finger interface surface for a certain period of time. Once the period of time has expired, continuous stepping is triggered in the graphical user interface. A process flow diagram of a method for implementing continuous stepping using quantized movement information is depicted in FIG. 14. At block 1402, quantized movement information, QX and QY, is accumulated. At decision point 1404, it is determined whether or not the user's finger has been lifted from the finger interface surface. If the user's finger has been lifted from the finger interface surface, then at block 1406 a single step is initiated in the graphical user interface. If the user's finger has not been lifted from the finger interface surface, then at decision point 1408 it is determined whether or not a pre-established time interval has expired. If the time interval has not expired, then the process returns to block 1402 and the quantized movement information continues to be accumulated. If the time interval has expired, then at block 1410 a continuous stepping mode is triggered. In an embodiment, the direction of the continuous stepping is determined by the accumulated quantized movement information or the previously set direction.

Although the rocker application has been described in terms of a four-way rocker application, the rocker application can be implemented as a 1, 2, or 3-way rocker application.

In the embodiment of FIG. 2, the navigation engine 112, quantization engine 114, and navigation application module 116 are described as being part of the optical navigation device. In another embodiment, the functions performed by these functional elements can be supported in part or entirely by a processor and memory of the computing device. In one embodiment, the optical navigation device outputs movement information, DX and DY, and a processor of the computing device quantizes the movement information and applies the quantized movement information to the selected navigation application, e.g., scrolling or four-way rocker. Additionally, the functions performed by the functional elements of FIG. 2 can be performed in hardware, software, firmware or a combination thereof.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A user input device comprising:
   an optical element comprising a finger interface surface;
   a light source in optical communication with the finger interface surface and configured to provide light from the light source to the finger interface surface;
   a sensor array configured to detect light reflected from the finger interface surface in response to contact between a finger and the finger interface surface;
   a navigation engine coupled to the sensor array, the navigation engine configured to generate lateral movement information, which is indicative of lateral movement of the finger relative to the sensor array, in response to the detected light, wherein the lateral movement information comprises first and second orthogonal components; and
   a quantization engine coupled to the navigation engine, the quantization engine configured to compare the first orthogonal component to the second orthogonal component and to generate first and second quantized orthogonal components in response to the comparison;
   wherein the quantization engine is configured to compare the lateral movement information to a window and to generate movement information indicative of one-dimensional movement if the lateral movement information falls outside the window and to generate movement information that is indicative of no movement if the lateral movement information falls inside the window;
   wherein the window is defined by a linear function, wherein the linear function is defined as $|DY|=M*|DX|+C$, where $|DY|$ is absolute y direction movement, $|DX|$ is absolute x direction movement M is a gradient, and C is the y intercept, and wherein if $|DY|$ is greater than or equal to $M*|DX|+C$ then the x direction movement is reduced, if $|DY|$ is less than $M^{-1}*|DX|-C$ then the y direction movement is reduced, and if $|DY|$ is less than or equal to $M*|DX|+C$ and greater than $M^{-1}*|DX|-C$ then both the x and y direction movement is reduced.

2. The user input device of claim 1 wherein the quantization engine is configure to change the lateral movement information from movement information that is indicative of two-dimensional movement to movement information that is indicative of one-dimensional movement in response to the comparison of the first and second orthogonal components.

3. The user input device of claim 2 wherein the quantization engine is configured to compare the magnitude of the first orthogonal component to the magnitude of the second orthogonal component.

4. The user input device of claim 3 wherein the quantization engine reduces the magnitude of the smallest of the first and second orthogonal components to change the lateral movement information from movement information that is indicative to two-dimensional movement to movement information that is indicative of one-dimensional movement.

5. The user input device of claim 1 further comprising a navigation application module configured to initiate a scroll function in response to at least one of the first and second quantized orthogonal components.

6. The user input device of claim 5 wherein the navigation application module is configured to compare one of the first and second quantized components to a scroll threshold and to determine the magnitude of a corresponding scroll operation in response to the comparison.

7. The user input device of claim 5 wherein the navigation application module is configured to compare one of the first and second quantized components to a scroll threshold and to generate a signal indicative of continuous scrolling if the quantized component exceeds the threshold.

8. The user input device of claim 5 wherein the navigation application module is further configured to stop generation of the signal indicative of continuous scrolling in response to detection of a finger tap on the finger interface surface.

9. The user input device of claim 1 further comprising a navigation application module configured to initiate a four-way rocker function in response to the first and second quantized orthogonal components.

10. The user input device of claim 9 wherein the navigation application module is configured to accumulate the first quantized orthogonal component, to accumulate the second quantized orthogonal component, and to generate an output signal that is indicative of a step function in response to the accumulated first quantized orthogonal component and the accumulated second quantized orthogonal component.

11. The user input device of claim 10 wherein the navigation application module is configured to compare the accumulated first quantized orthogonal component and the accumulated second quantized orthogonal component to a step threshold and to generate a signal indicative of a step if the step threshold is exceeded.

12. The user input device of claim 11 wherein the navigation application module is configured to compare a second set of an accumulated first quantized orthogonal component and an accumulated second quantized orthogonal component to the step threshold and to generate a signal indicative of another step even if the step threshold is not exceeded as long as the previous accumulated quantized movement information was above the step threshold.

13. The user input device of claim 9 wherein the navigation application module is configured to determine if the finger has been lifted from the finger interface surface within a certain pre-established time interval and to initiate a continuous stepping operation if the finger has not been lifted from the finger interface surface upon expiration of the pre-established time interval.

14. A method for optical finger navigation, the method comprising:
generating light at a light source;
directing the light to a finger interface surface;
detecting light reflected from the finger interface surface toward a sensor array in response to finger contact at the finger interface surface;
generating lateral movement information, which is indicative of lateral movement of the finger relative to the sensor array, in response to the detected light, wherein the lateral movement information comprises first and second orthogonal components;
comparing the first orthogonal component to the second orthogonal component; and
generating first and second quantized orthogonal components in response to the comparison;
further comprising comparing the lateral movement information to a window, generating movement information indicative of one-dimensional movement if the lateral movement information falls outside the window, and generating movement information that is indicative of no movement if the lateral movement information falls inside the window;
wherein the window is defined by a linear function, wherein the linear function is defined as $|DY|=M*|DX|+C$, where $|DY|$ is absolute y direction movement, $|DX|$ is absolute x direction movement M is a gradient, and C is the y intercept, and wherein if $|DY|$ is greater than or equal to $M*|DX|+C$ then the x direction movement is reduced, if $|DY|$ is less than $M^{-1}*|DX|-C$ then the y direction movement is reduced, and if $|DY|$ is less than or equal to $M*|DX|+C$ and greater than $M^{-1}*|DX|-C$ then both the x and y direction movement is reduced.

15. The method of claim 14 further comprising reducing the magnitude of the smallest of the first and second orthogonal components to change the lateral movement information from movement information that is indicative of two-dimensional movement to movement information that is indicative of one-dimensional movement.

16. A user input device comprising:
an optical element comprising a finger interface surface;
a light source in optical communication with the finger interface surface and configured to provide light from the light source to the finger interface surface;
a sensor array configured to detect light reflected from the finger interface surface in response to contact between a finger and the finger interface surface;
a navigation engine coupled to the sensor array, the navigation engine configured to generate lateral movement information, which is indicative of lateral movement of the finger relative to the sensor array, in response to the detected light, wherein the lateral movement information comprises first and second orthogonal components; and
a quantization engine coupled to the navigation engine, the quantization engine configured to compare the first orthogonal component to the second orthogonal component and to generate first and second quantized orthogonal components in response to the comparison; and
comprising a navigation application module configured to initiate a four-way rocker function in response to the first and second quantized orthogonal components;
wherein the navigation application module is configured to accumulate the first quantized orthogonal component, to accumulate the second quantized orthogonal component, and to generate an output signal that is indicative of a step function in response to the accumulated first quantized orthogonal component and the accumulated second quantized orthogonal component;
wherein the navigation application module is configured to compare the accumulated first quantized orthogonal component and the accumulated second quantized orthogonal component to a step threshold and to generate a signal indicative of a step if the step threshold is exceeded; and
wherein the navigation application module is configured to compare a second set of an accumulated first quantized orthogonal component and an accumulated second quantized orthogonal component to the step threshold and to generate a signal indicative of another step even if the step threshold is not exceeded as long as the previous accumulated quantized movement information was above the step threshold.

* * * * *